Figure 1:
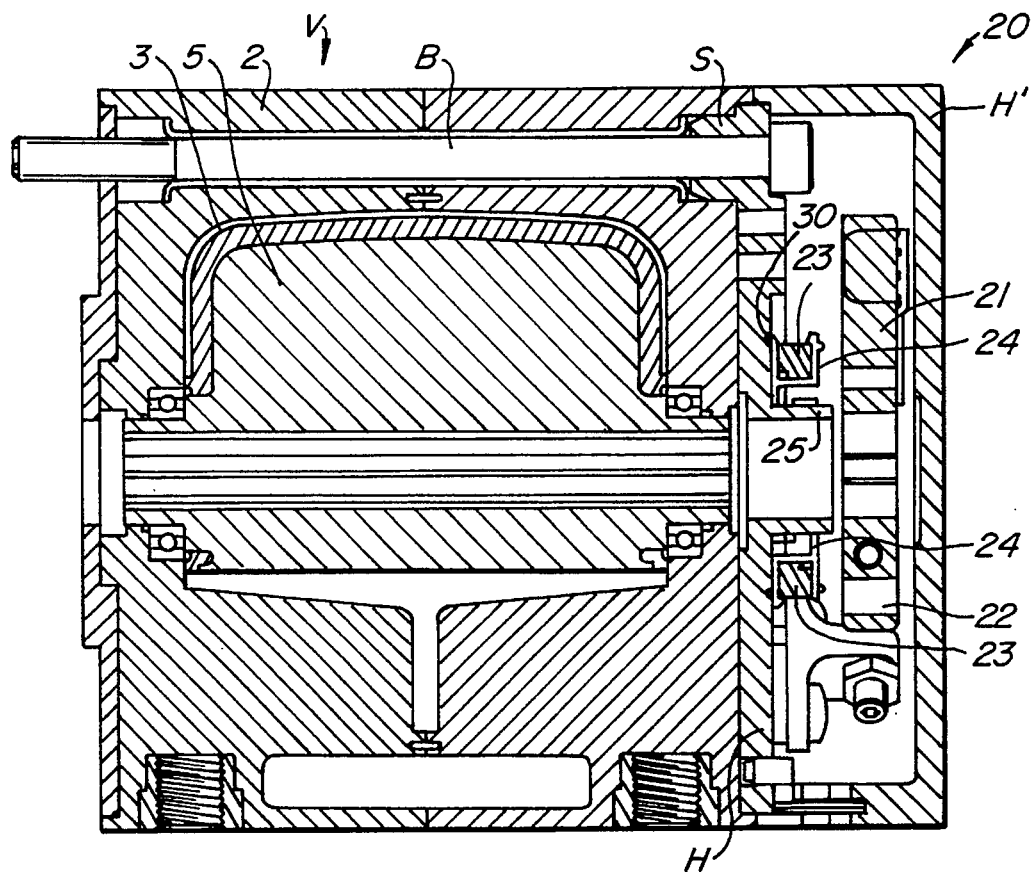

United States Patent [19]
Granberg

[11] Patent Number: 5,622,096
[45] Date of Patent: Apr. 22, 1997

[54] ROTATIONAL POSITION DETECTOR DEVICE FOR ROTARY ACTUATOR

[75] Inventor: Rune Granberg, Älvsjö, Sweden

[73] Assignee: AB Rexroth Mecman, Stockholm, Sweden

[21] Appl. No.: 626,260

[22] Filed: Mar. 29, 1996

[30] Foreign Application Priority Data

Mar. 31, 1995 [SE] Sweden .................................. 9501187

[51] Int. Cl.$^6$ ............................................. F01B 31/12
[52] U.S. Cl. .................................. 92/5 R; 92/120
[58] Field of Search .......................... 91/1; 92/5 R, 120, 92/121, 122, 123

[56] References Cited

U.S. PATENT DOCUMENTS

| | | |
|---|---|---|
| 3,139,834 | 7/1964 | Blumgren et al. . |
| 4,536,130 | 8/1985 | Orlando et al. ...................... 92/5 R |
| 5,000,077 | 3/1991 | Habicht ................................. 92/5 R |
| 5,040,453 | 8/1991 | Eicher et al. . |
| 5,330,333 | 7/1994 | Holmes . |

FOREIGN PATENT DOCUMENTS

| | | |
|---|---|---|
| 0384948 | 6/1989 | European Pat. Off. . |
| 1750601 | 5/1968 | Germany . |
| 0224276 | 12/1965 | Sweden . |
| 2239053 | 6/1991 | United Kingdom . |

*Primary Examiner*—F. Daniel Lopez
*Attorney, Agent, or Firm*—Townsend and Townsend and Crew LLP

[57] ABSTRACT

A rotational position detector device (20), which is fastenable to a rotary actuator (1) of the type comprising a rotary motor (3,5) inside a housing (2) and a rotary shaft extending therefrom, a turning element (21) adapted to be rotationally fastened to the rotary shaft, said turning element being detectable by at least one position sensor (23), which is adapted to be adjustably fixed with respect to the housing (2). The device is provided with a socket portion (25) which is rigidly connected to the housing and coaxial with said shaft and at least one sensor holder (24) which is rotatably attached to said socket portion and adjustably fixable in chosen angular positions by means of locking cooperation between a resilient engagement means (26,27) on the sensor holder and a surface (30) which is provided with engagement irregularities.

11 Claims, 2 Drawing Sheets

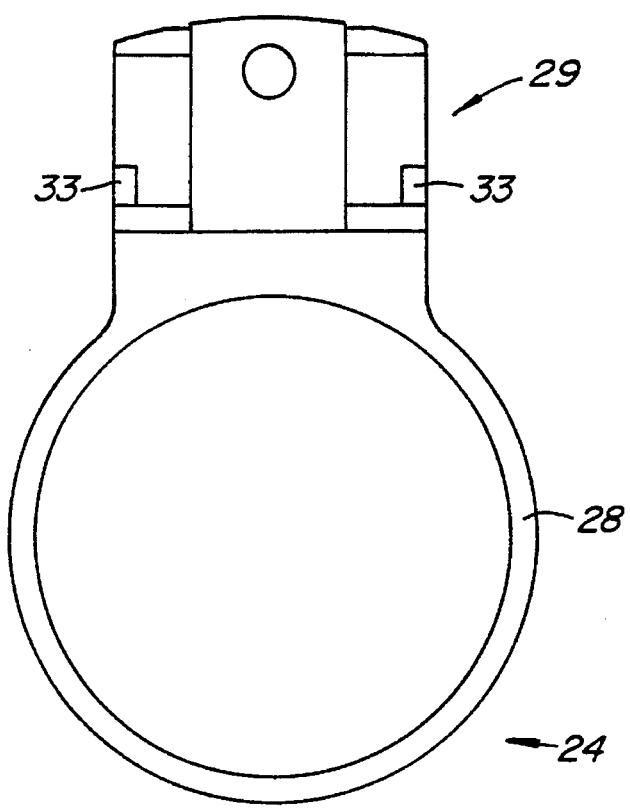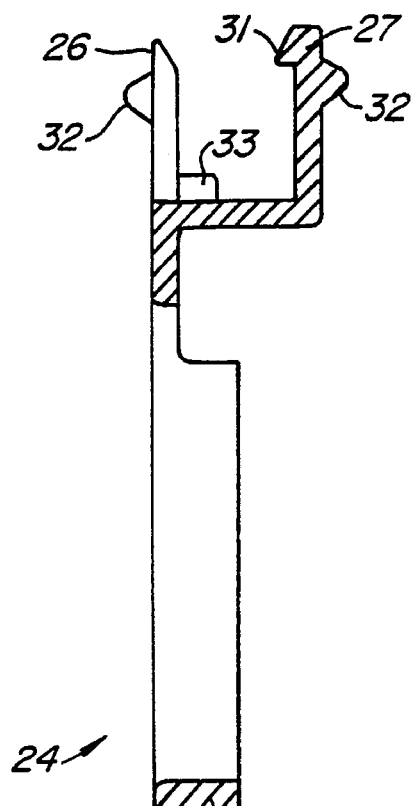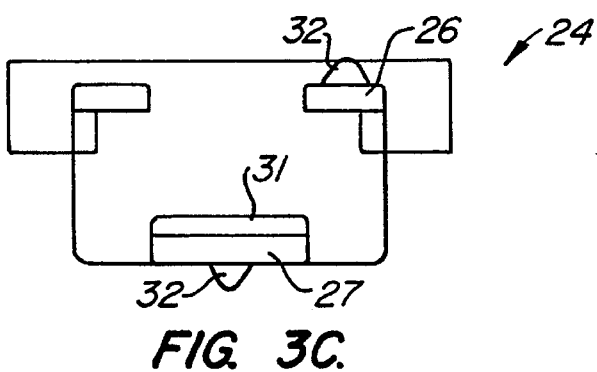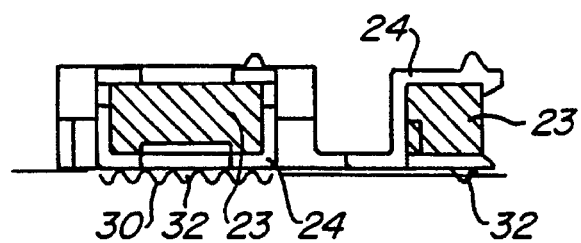

ROTATIONAL POSITION DETECTOR DEVICE FOR ROTARY ACTUATOR

This invention concerns a rotational position detector device.

Such a device in connection with rotary actuators for obtaining a rotary movement has been put on the market by the applicant under the designation Mecman detector unit 322. This detector unit is of relatively complicated construction and is adjusted by lo means of adjustment screws, resulting in a relatively cumbersome manufacture as well as adjustment procedure.

It is an aim of this invention to improve a rotational position detector device according to the above so as to minimize the adjustment work, reduce the number of parts involved and propose a solution which is easy to manufacture.

By each sensor holder being rotatably arranged on the socket portion and fixable in chosen angular positions by locking cooperation with a surface which is arranged for that purpose, simplicity with respect to angular position adjustment is achieved since the adjustment may be preformed by moving the sensor holder with the aid of a simple tool such as a pin, a screwdriver or the like and further results in need of a reduced number of parts involved which leads to simple mounting and effective manufacture.

The surface being perpendicular to an axis of the socket portion results in effective locking cooperation.

The sensor holder consisting of a ring portion and a sensor engagement portion concerns a preferred construction of the sensor holder, allowing manufacture in one piece from, as an example, a suitable plastic.

The sensor engagement portion includes inwardly directed projections for holding the sensor and outwardly directed projections as the engagement means, which results in simple and effective holding of the sensor body as well as a preferred arrangement of the engagement means.

The sensor engagement portion includes arms axially displaced from each other, which concern preferred aspects of the sensor holder when two sensors are used for detecting two separate angular positions for the rotary actuator.

The sensor engagement portion includes a u-shaped form, which accentuate the ease of manufacture of the sensor holder.

The surface is provided with toothlike irregularities, which concerns a preferred and effective locking surface construction.

Figure 2:
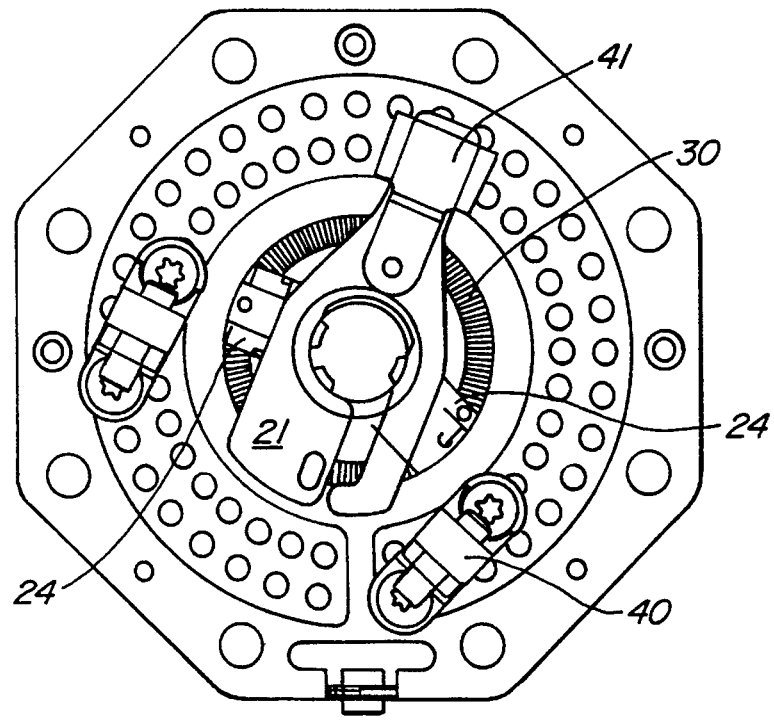

The invention will now described in greater detail at the background of embodiments and with reference to the annexed drawings, wherein:

FIG. 1 shows a rotational position detector device according to the invention mounted on a rotary actuator in an axial section, FIG. 2 shows the device according to FIG. 1 in a side view, FIGS. 3a–c show a sensor holder in a larger scale and in different views, and FIG. 4 shows a detail of sensor holders with sensors.

Rotational position detector device 20 as seen on FIG. 1 is provided with a housing consisting of a base plate H and a cover portion H' which are mutually connectable in a suitable manner, for example by screw means or snap-in connection. The housing is connected to a rotary actuator V by means of bolts B or other suitable fastening means. The detail S is an axially extending guide socket for cooperation with the particular rotary actuator V which is provided with corresponding recesses.

Inside the housing HH' the detector device 20 is provided with a socket portion 25 which extends axially inwards into the housing and is joined to the base plate of the housing. Two sensor holders 24 for holding sensors 23 are mounted on the socket portion 25 which is arranged coaxially with the outgoing shaft of the rotary actuator and which is provided with a generally circular cylindric outer surface. The sensors 23 detects the presence of a neighbouring magnet (at 22, not shown) which in use of the device is arranged on a turning arm or a turning element 21 which is rigidly connected to the outgoing shaft of the rotary actuator in use.

In order to hold the sensor holders 24 axially they are locked axially by means of a conventional locking ring (not shown) which is mounted at the outer part of the socket portion 25.

Each sensor holder 24 is individually rotatable around the socket portion 25 and fixable in the rotational direction by its cooperation between respective first 26 and second 27 (FIG. 3) resilient engagement means cooperating with an engagement surface 30 on the base plate 2 of the housing.

FIG. 2 shows the base plate H of the housing when the cover portion is removed, whereby rotation limiters 40 and circular paths of holes 41 for fixation of said rotation limiter 40 are shown. These details are not subject of this patent application. Further the sensor holders 24 are illustrated (partly in interrupted line) as well as the engagement surface 30 which thus is a surface which is provided with engagement irregularities, here in the form of radially extending tooth-like elements which is also illustrated in FIG. 4. Further the turning element 21 with the recess 22 for a magnet and also the turning arm end portion 31 which cooperates with said rotation limiter 40 are illustrated.

The sensor holder 24 is illustrated in greater detail in FIGS. 3a–c, whereby the sensor holder 24 on the one hand is provided with a ring shaped portion 28 and on the other hand with a sensor engagement portion 29 rigidly joined thereto, said parts 28 and 29 in the shown example being integrated in one unit. The ring portion is dimension so as to be mounted around the socket portion 25 (FIG. 1) with the fit and with its greatest axial extension being approximately half of the axial extension of the engagement portion such that two sensor holders 24 placed in different directions may be arranged on the same total axial extension. For that purpose the axial extension of the ring portion 28 serves for distance holding of the outer sensor holder 24 (see FIG. 1).

FIG. 3b further illustrate the sidewardly U-shaped sensor engagement portion 29, whereby the first 26 as well as the second 27 resilient engagement means are upwardly provided with locking lugs 32 for locking cooperation with the surface 30 (FIGS. 1 and 2) such that the locking cooperation may be obtained having the sensor holder 24 turned in either direction. Further an engagement lug 31 and side bosses 32 for fastening (the not shown) sensor body are illustrated.

FIG. 3c shows the sensor engagement portion 29 as seen from above in FIG. 3a having the locking lugs 32 arranged on the respective engagement means 26 and 27 and the engagement lug 31 extending along the side length of the second engagement means.

FIG. 4, finally, shows in detail sensor holder 24 with mounted sensors 23. The lower locking lugs in the figure are in engagement with the surface 30.

The invention may be modified within the scoop of the claims and as an example the sensor holders may have an other construction than what is shown, for example with respect to the sensor engagement portion 29. Within the scoop of the invention is having at least one sensor holder, thus also for example three, which are arranged on the socket portion 25, in which case they have at least a differently formed ring portion.

It is also to be understood that the equipment may be used for other types of rotary actuators, whereby the adjustment surface in such case must be shaped to match that particular rotary actuator.

By a construction according to the invention rational manufacture of the parts involved is allowed whereby the housing portions are preferably manufactured in a diecasting process from for example a zinc or an aluminium alloy and having the socket portion 25 integral with the base plate. Also manufacture in other materials is within the scoop of the invention.

The used sensors may be inductive or of any other kind, as an example also Hall-effect sensors may come into question.

I claim:

1. Rotational position detector device (20), which is fastenable to a rotary actuator (1) of the type comprising a rotary motor (3,5) inside a housing (2) and a rotary shaft extending therefrom, a turning element (21) adapted to be rotationally fastened to the rotary shaft, said turning element being detectable by at least one position sensor (23), which is adapted to be adjustably fixed with respect to the housing (2), characterized in a socket portion (25) which is rigidly connected to the housing and coaxial with said shaft, at least one sensor holder (24) which is rotatably attached to said socket portion and adjustably fixable in chosen angular positions by means of locking cooperation between a resilient engagement means (26,27) on the sensor holder and a surface (30) which is provided with engagement irregularities.

2. Device according to claim 1, characterized in that said surface (30) has a general extension perpendicular to the axis of said socket portion (25).

3. Device according to claim 2, characterized in that the sensor holder (24) consists of a ring-shaped ring portion (28) surrounding the periphery of the socket portion and a sensor engagement portion (29).

4. Device according to claim 3, characterized in that the sensor engagement portion (29) inwardly is provided with projections for holding cooperation with a sensor and outwardly with said engagement means (26, 27).

5. Device according to claim 4, characterized in that the sensor engagement portion (29) comprises engagement means (26,29) which are directed in different axial directions to allow turnability.

6. Device according to claim 5, characterized in that the ring portion (28) is axially displaced with respect to the sensor engagement portion (29), thereby allowing placement of two different sensor holders (24) differently turned and directed on essentially the same axial space.

7. Device according to claim 3, characterized in that the sensor engagement portion (29) as seen in a direction perpendicular to its extension from the ring portion and in parallel with the main plane thereof, approximately comprises the form of a U.

8. Device according to claim 7, characterized in that the essentially parallel parts of the sensor engagement portion (29) (as seen from one side), forming the U-shape, lack overlap as seen in a direction parallel with the axis of the ring portions.

9. Device according to claim 1, characterized in that said surface (30) extends annularly around the socket portion (25).

10. Device according to claim 1, characterized in that the surface (30) is provided with tooth-like engagement irregularities.

11. Device according to claim 1, characterized in that the turning element (21) is comprised of an arm in order to limit the rotary angle.

* * * * *